Jan. 11, 1955
J. E. KAVANAUGH
2,699,355
VEHICLE BODY AND DOOR STRUCTURE
Filed Sept. 18, 1952
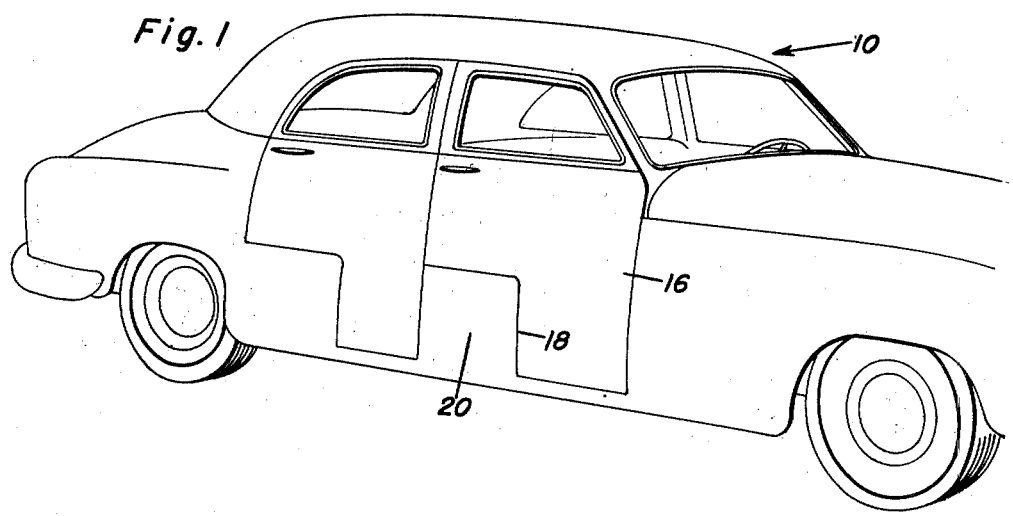
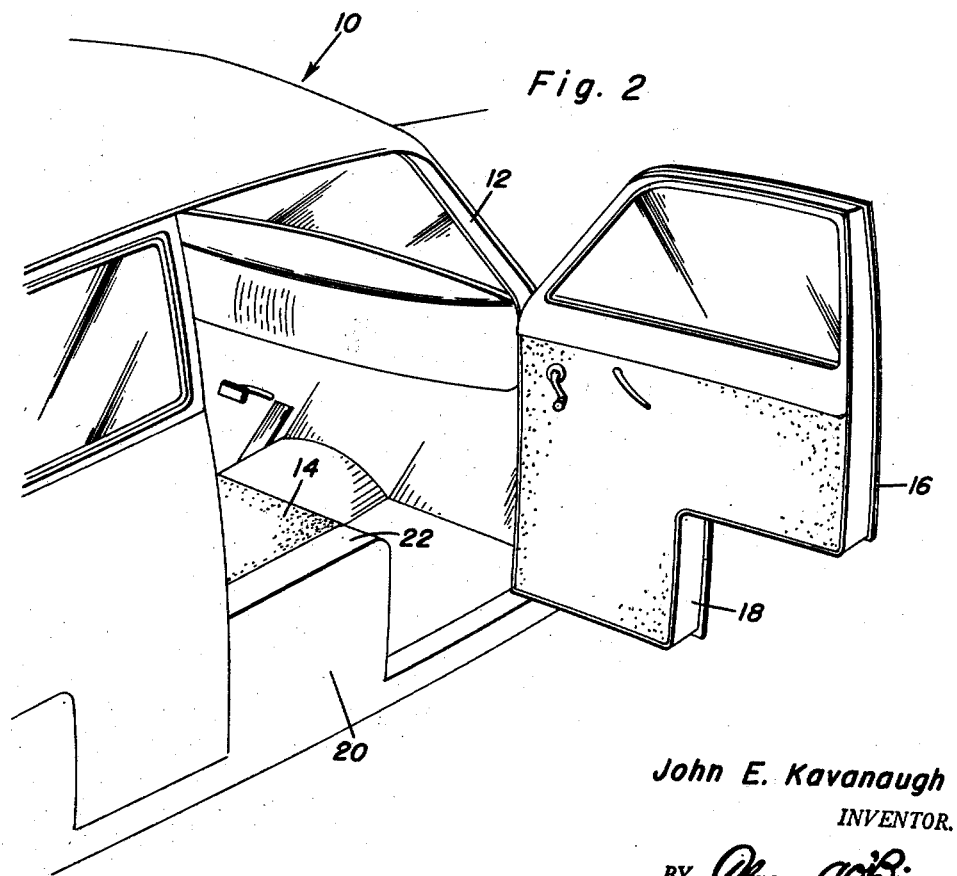
John E. Kavanaugh
INVENTOR.

United States Patent Office 2,699,355
Patented Jan. 11, 1955

2,699,355

VEHICLE BODY AND DOOR STRUCTURE

John E. Kavanaugh, Oakland, Calif.

Application September 18, 1952, Serial No. 310,179

1 Claim. (Cl. 296—44)

This invention relates to new and useful improvements and structural refinements in vehicle bodies, particularly bodies of automobiles, and the principal object of the invention is to facilitate opening of doors without hitting high curbs or other similar obstructions.

As is well known, an automobile door very often cannot be fully opened because the outer, lower corner thereof comes in contact with a high curb. The instant invention eliminates this disadvantage by recessing the outer lower corner portion of the door so as to afford clearance for the curb and facilitate full opening of the door.

The recessed portion of the improved door is complemented by a portion of the side wall of the vehicle body when the door is closed, and another feature of the instant invention resides in arranging the complemental body portion in such manner that it is coextensive with the outer end of the usual seat and thereby affords a relatively rigid guide or rest for persons entering or leaving the vehicle.

With the above more important objects and features in view and such other objects and features as may become apparent as this specification proceeds, the invention consists essentially of the arrangement and construction of parts as illustrated in the accompanying drawings, in which:

Figure 1 is a fragmentary perspective view of an automobile embodying the invention, and Figure 2 is a fragmentary perspective view of the automobile body with one of the doors in its open position.

Like characters of reference are employed to designate like parts in the specification and throughout the several views.

Referring now to the accompanying drawings in detail, the automobile body is designated generally by the reference character 10 and includes a side wall provided with a door opening 12.

The usual seat 14 extends inwardly from the side wall adjacent the rear edge of the door opening and a door 16 is hinged at its forward edge to the side wall of the body 10.

The essence of novelty in the invention resides in providing the outer, lower corner portion of the door 16 with a recess 18, so that when the door is opened, it does not come in contact with high curbs, et cetera.

A panel portion 20 of the body side wall is complemental to the recessed portion 18 of the door 16 when the door is closed. The panel portion 20 is substantially coextensive with and disposed at the outer end of the seat 14, so that the upper edge 22 of the panel portion 20 is substantially flush with the upper surface of the seat.

The panel portion 20 is substantially of the same thickness as the door 16 and the upper edge 22 thereof affords a convenient guide or rest for use by persons entering or leaving the vehicle. In other words, the guide or rest 22 may be leaned or sat upon while the user passes through the door opening, thereby eliminating the usual inconvenience and discomfort such as are experienced in attempting to pass through the door opening and seating on the relatively soft seat.

Although the invention has been described in connection with only one door, it is obvious that the teachings thereof may be extended to all the doors of the vehicle, as shown in the accompanying drawings.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

A motor vehicle comprising; a low body including a side wall having a door opening therein extending from the top to the bottom thereof, a seat in said body adjacent the opening, and a door for the opening hingedly mounted on the body at the front of said opening, said door having a recess of substantial dimensions in the lower portion of its free end extending substantially to the seat level for clearing street curbs when the door is opened, said side wall comprising a panel extending upwardly substantially to the seat level and engageable in the recess and conforming to the shape thereof for closing same when the door is closed.

References Cited in the file of this patent

UNITED STATES PATENTS

| | | |
|---|---|---|
| 1,046,201 | Kraetzer | Dec. 3, 1912 |
| 1,294,447 | Grosse | Feb. 18, 1919 |
| 1,458,173 | Fisher | June 12, 1923 |

FOREIGN PATENTS

| | | |
|---|---|---|
| 818,844 | France | June 28, 1937 |